(12) United States Patent
Tatsumi et al.

(10) Patent No.: US 7,721,253 B2
(45) Date of Patent: May 18, 2010

(54) SOFTWARE DEVELOPMENT SUPPORT SYSTEM

(75) Inventors: Tetsu Tatsumi, Chuo-ku (JP); Koki Tao, Chuo-ku (JP); Yasuhiro Saito, Chuo-ku (JP)

(73) Assignee: NS Solutions Corporation, Tokyo (JP)

( * ) Notice: Subject to any disclaimer, the term of this patent is extended or adjusted under 35 U.S.C. 154(b) by 1060 days.

(21) Appl. No.: 11/384,320

(22) Filed: Mar. 21, 2006

(65) Prior Publication Data
US 2006/0218523 A1 Sep. 28, 2006

(30) Foreign Application Priority Data
Mar. 23, 2005 (JP) ............... 2005-083931

(51) Int. Cl.
*G06F 9/44* (2006.01)
(52) U.S. Cl. ............... 717/106; 717/107; 717/110; 717/122
(58) Field of Classification Search ............... 717/106, 717/110, 107, 122
See application file for complete search history.

(56) References Cited

U.S. PATENT DOCUMENTS

| | | | | |
|---|---|---|---|---|
| 4,819,233 | A * | 4/1989 | Delucia et al. | 717/129 |
| 5,265,254 | A * | 11/1993 | Blasciak et al. | 717/130 |
| 5,881,288 | A * | 3/1999 | Sumi et al. | 717/125 |
| 6,249,905 | B1 * | 6/2001 | Yoshida et al. | 717/100 |
| 7,100,195 | B1 * | 8/2006 | Underwood | 726/2 |
| 7,149,734 | B2 * | 12/2006 | Carlson et al. | 707/6 |
| 7,454,744 | B2 * | 11/2008 | Bhogal et al. | 717/122 |
| 2001/0034880 | A1 * | 10/2001 | Dzoba et al. | 717/4 |
| 2002/0053070 | A1 * | 5/2002 | Seki | 717/107 |
| 2003/0204637 | A1 * | 10/2003 | Chong | 709/310 |
| 2004/0078585 | A1 * | 4/2004 | Cronce et al. | 713/193 |
| 2004/0078780 | A1 * | 4/2004 | Dutt et al. | 717/106 |
| 2005/0091230 | A1 * | 4/2005 | Ebbo et al. | 707/100 |

FOREIGN PATENT DOCUMENTS

| | | |
|---|---|---|
| JP | 7-129382 A | 5/1995 |
| JP | 2000-66889 A | 3/2000 |

* cited by examiner

*Primary Examiner*—Wei Y Zhen
*Assistant Examiner*—Chih-Ching Chow
(74) *Attorney, Agent, or Firm*—Crowell & Moring LLP

(57) ABSTRACT

The invention provides a software development support system capable of reflecting the content added by a person to source code in source code generated again, without modifying design information.

A generator 41 generates source code in which plural insertion markers are inserted on the basis of design information. An extracting portion 43 extracts code (inserted code) contained in a range specified by each insertion marker in source code. Each extracted inserted code is associated with its identification information and stored into a saving portion 32. When the generator 41 generates source code, a combining portion 44 performs a process of combining inserted code with the relevant source code and outputs the processed source code, wherein the relevant inserted code is included in plural pieces of inserted code stored in the saving portion 32, source code identified by the identification information for the relevant inserted code coincides with the relevant source code and an insertion marker identified by this identification information exists in the relevant source code and coincides with the relevant insertion marker.

10 Claims, 11 Drawing Sheets

| data definition | |
|---|---|
| data type | Person |
| description | Data representing a person |
| package | jp.co.ns_sol.sysrdc |

| attributes list | | |
|---|---|---|
| symbol | type | access limitation |
| name | String | |
| address | String | |
| dateOfBirth | Date | |
| age | Integer | readonly |
| phoneNo | String | |

(b)

| data definition | |
|---|---|
| data type | Person |
| description | Data representing a person |
| package | jp.co.ns_sol.sysrdc |

| attributes list | | |
|---|---|---|
| symbol | type | access limitation |
| name | String | |
| address | String | |
| dateOfBirth | Date | |
| age | Integer | readonly |
| phoneNo | String | |
| mailAddress | String | |

```
package jp.co.ns_sol.sysrdc;

definition Person {
    attribute String    name;
    attribute String    address;
    attribute Date      dateOfBirth;
    attribute Integer   age (readonly);
    attribute String    phoneNo;
}
```

(b)

```
package jp.co.ns_sol.sysrdc;

definition Person {
    attribute String    name;
    attribute String    address;
    attribute Date      dateOfBirth;
    attribute Integer   age (readonly);
    attribute String    phoneNo;
    attribute String    mailAddress;
}
```

F I G. 4

```
/*
 * Person.java
 *
 *     Copyright (C) 2005 NS Solutions Corporation.
 *     All Rights Reserved.
 *
 */ package jp.co.ns_sol.sysrdc.model;

import jp.co.ns_sol.sysrdc.common.*;
import jp.co.ns_sol.sysrdc.util.*;
import jp.co.ns_sol.sysrdc.value.*;
import jp.co.ns_sol.sysrdc.interfaces.*;
import jp.co.ns_sol.sysrdc.model.*;
// NSStella mixin point (imports) BEGIN        ]  ← M1
// NSStella mixin point (imports) END          ]

/**
 *      User-defined data class : Data representing a person
// NSStella mixin point (comment) BEGIN        ]  ← M2
// NSStella mixin point (comment) END          ]
 */
public class Person extends BaseClass implements java.lang.Cloneable { private String     name;
    private String     address;
    private Date       dateOfBirth;
    private Integer    age;

private String     phoneNo;
// NSStella mixin point (fields) BEGIN          ]  ← M3
// NSStella mixin point (fields) END            ]

public String getName() throws ApplicationException {
```

FIG. 5

```
        return name;
    } public void setName(String name) throws ApplicationException {
        this.name = name;
    } public String getAddress() throws ApplicationException {
        return address;
    } public void setAddress(String address) throws ApplicationException {
        this.address = address;
    } public Data getDateOfBirth() throws ApplicationException {
        return dateOfBirth;
    } public void setAddress(Data dateOfBirth) throws ApplicationException {
        this.dateOfBirth = dateOfBirth;
    } public Integer getAge() throws ApplicationException {
// NSStella mixin point (age_readonly) BEGIN        ⎤
// NSStella mixin point (age_readonly) END          ⎦  ←——— M4
    } public String getPhoneNo() throws ApplicationException {
        return phoneNo;
    } public void setPhoneNo(String phoneNo) throws ApplicationException {
        this.phoneNo = phoneNo;
    }
```

F I G. 6

```
    public void setBaseData() {
// NSStella mixin point (methods) BEGIN        <──────── M5
        try {
            if (getBaseObject().getBaseData() != null) {
                setBaseData(convert(getBaseObject().getBaseData(), this));
            }
        } catch (BaseObjectException e) {
            throw new ApplicationException(e);
        }
// NSStella mixin point (methods) END          <──────── M5
    }

}

// NSStella mixin point (file_tail) BEGIN  ]
// NSStella mixin point (file_tail) END    ] <──────── M6
```

FIG. 7

```
/*
 * Person.java
 *
 *     Copyright (C) 2005 NS Solutions Corporation.
 *     All Rights Reserved.
 *
 */ package jp.co.ns_sol.sysrdc.model;

import jp.co.ns_sol.sysrdc.common.*;
import jp.co.ns_sol.sysrdc.util.*;
import jp.co.ns_sol.sysrdc.value.*;
import jp.co.ns_sol.sysrdc.interfaces.*;
import jp.co.ns_sol.sysrdc.model.*;
// NSStella mixin point (imports) BEGIN
// NSStella mixin point (imports) END /**
 *     User-defined data class : Data representing a person
// NSStella mixin point (comment) BEGIN
// NSStella mixin point (comment) END
 */
public class Person extends BaseClass implements java.lang.Cloneable { private String    name;
    private String    address;
    private Date      dateOfBirth;
    private Integer   age;
    private String    phoneNo;
    private String    maileAddress;
// NSStella mixin point (fields) BEGIN
// NSStella mixin point (fields) END public String getName() throws ApplicationException {
```

FIG. 8

```
        return name;
    } public void setName(String name) throws ApplicationException {
        this.name = name;
    } public String getAddress() throws ApplicationException {
        return address;
    } public void setAddress(String address) throws ApplicationException {
        this.address = address;
    } public Data getDateOfBirth() throws ApplicationException {
        return dateOfBirth;
    } public void setAddress(Data dateOfBirth) throws ApplicationException {
        this.dateOfBirth = dateOfBirth;
    } public Integer getAge() throws ApplicationException {
// NSStella mixin point (age_readonly) BEGIN
// NSStella mixin point (age_readonly) END
    } public String getPhoneNo() throws ApplicationException {
        return phoneNo;
    } public void setPhoneNo(String phoneNo) throws ApplicationException {
        this.phoneNo = phoneNo;
    }
```

FIG. 9

```
    public String getMailAddress() throws ApplicationException {
        return mailAddress;
    } public void setMailAddress(String mailAddress) throws ApplicationException {
        this.mailAddress = mailAddress;
    } public void setBaseData() {
// NSStella mixin point (methods) BEGIN
        try {
            if (getBaseObject().getBaseData() != null) {
                setBaseData(convert(getBaseObject().getBaseData(), this));
            }
        } catch (BaseObjectException e) {
            throw new ApplicationException(e);
        }
// NSStella mixin point (methods) END
    }

}

// NSStella mixin point (file_tail) BEGIN
// NSStella mixin point (file_tail) END
```

F I G. 1 1
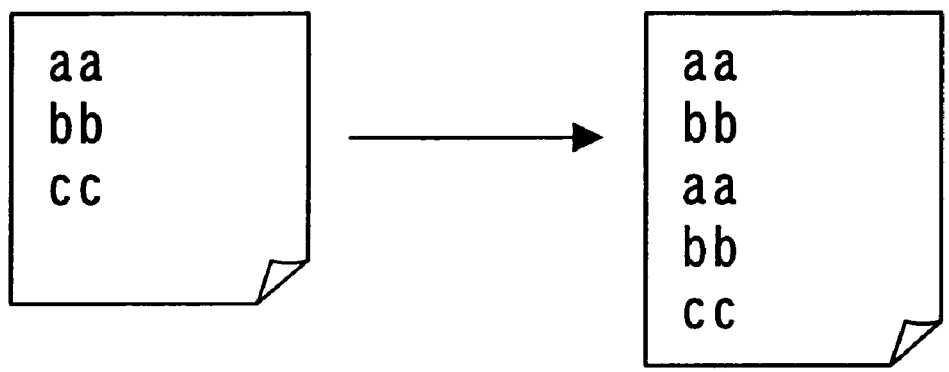

SOFTWARE DEVELOPMENT SUPPORT SYSTEM

BACKGROUND OF THE INVENTION

1. Field of the Invention

The present invention relates to a software development support system for supporting development of software by a developer (programmer).

2. Related Art

At present, in development of software a software development support tool provided with a source code generator function is often used. The source code generator is a tool automatically generating source code (program) according to a certain rule on the basis of inputted design information (specification information).

In the development of software using such a software development support system, first the confirmation and the like of operation on source code generated by the source code generator are performed. Next, according to the result and the like, modification on the source code itself or modification on design information such as addition of a function, modification of a process and the like is performed. In case that some modification on the design information has been performed, source code is generated again by the source code generator on the basis of the design information. Such work is not limited to one time but is repeated any number of times until the software is completed.

By the way, even if a developer modifies source code generated for the first time, when a source code generator performs again an automatic generation of source code, the modified part is usually deleted by being overwritten. For example, it is assumed that a comment statement has been inserted into source code generated for the first time. And when source code is generated again on the basis of the same design information, the comment statement is not contained in the source code generated for the second time. In this case, since no modification is applied to the design information itself, the source code generator generates the same source code whether generation is performed for the first time or the second time. In such a way, since in software development using a conventional source code generator a developer often has to apply the same modification to source code each time a source code generator generates the source code, there has been a problem of being not capable of efficiently performing software development.

In order to solve such a problem, there has been proposed a software development support system which converts source code modified by a developer after being automatically generated by a source code generator into a design drawing by means of an implementation information extracting device, stores the design drawing as implementation information in a database and reflects the implementation information in the design information (see Japanese Unexamined Patent Application Publication No. H 7-129,382, for example). And there has been also proposed a system which extracts a difference in specific description due to the number of digits or the specifications of language between source code A before being modified and source code B after being modified and makes design information after being modified on the basis of this difference information (see Japanese Unexamined Patent Application Publication No. 2000-66, 889, for example). These systems solve the above problem by reflecting the contents of modification applied to source code by a developer in design information and inputting the new design information having the reflection into the source code generator. By the way, such a prior art as disclosed in Japanese Unexamined Patent Application Publication No. H 7-129,382 or Japanese Unexamined Patent Application Publication No. 2000-66,889 modifies design information itself on the basis of the contents of modification applied to source code by a developer. Hence, for example in case of performing a modification which does not need to be defined in design information or a modification which a portion equivalent to is not included in design information such as addition of a mere comment statement or the like, these prior arts cannot cope with such a case and the content of modification performed by a developer is not reflected in source code.

And a source code generator and a developer each may take partial charge of the development of software such that a developer makes a source code generator generate typical source code, and implements for him/herself non-typical source code such as business logic and the like. In such a way, in case that it is premised that a source code generator and a developer each take partial charge of work, since it is originally unnecessary to reflect the portion implemented by a developer in design information, application itself of the above-mentioned prior arts is not considered.

And it may be also technically difficult to correctly extract a portion modified by a developer in source code. For example, it is assumed that source code having the content of aa, bb and cc is generated by a source code generator, as shown in the left part of FIG. 11, and then a developer adds aa and bb to this source code, as shown in the right part of FIG. 11. In this case, a technique of taking a difference between the two pieces of source code by comparing them with each other like the prior art disclosed in Japanese Unexamined Patent Application Publication No. 2000-66,889 cannot determine whether it is the upper aa and bb or the lower aa and bb that is added by the developer or may perform an erroneous determination.

Like this, up to now there has been a case that it is not possible to reflect the content added by a developer to source code in source code generated again by using the above-mentioned prior art. That is to say, the scope of application of a prior art of modifying design information on the basis of the content of modification applied by a developer to source code is narrow, and there has been a case that it is not possible to perform efficient software development by using such a prior art. And in case that some addition to design information has been performed additionally to a modification on source code performed by a developer, it is desired to implement a software development support system capable of generating source code having both the modifications reflected in it.

The present invention has been performed on the basis of the above circumstances and has as an object of it providing a software development support system capable of reflecting the content added by a developer to source code in source code generated again, without modifying design information.

SUMMARY OF THE INVENTION

The invention according to claim 1 for achieving the above object is a software development support system used for a developer to perform software development as adding or modifying the content of source code displayed on a screen of a display section, the system comprising; a source code generating section that generates source code in which one or plural insertion markers are respectively inserted into specified places on the basis of design information, an inserted code extracting section that extracts code contained in a range specified by each of the insertion markers in the source code as inserted code, and, for each extracted inserted code, acquires identification information for identifying the source code and the insertion marker in which the relevant inserted code is contained, an inserted code storing section that stores each inserted code extracted by the inserted code extracting section, associating the relevant inserted code with the identification information for the relevant inserted code, and a code combining section that, when the source code generating section generates the source code, performs a process of combining the inserted code with a range specified by the insertion marker in the relevant source code, wherein the relevant inserted code is included in plural pieces of inserted code stored in the inserted code storing section, the source code identified by the identification information for the relevant inserted code coincides with the relevant source code, and the insertion marker identified by the relevant identification information exists in the relevant source code and coincides with the relevant insertion marker.

The invention according to claim 2 is a software development support system according to claim 1, wherein; when the source code generating section generates the source code, the code combining section detects that there is the inserted code not combined with the relevant source code, if the relevant inserted code, for which the source code identified by the identification information coincides with the relevant source code but the insertion marker identified by the identification information does not exist in the relevant source code, is included in plural pieces of inserted code stored in the inserted code storing section.

The invention according to claim 3 is a software development support system according to claim 1 or 2, further comprising a code editing section that edits the source code and restricts inputting of code in a range other than a range specified by the insertion marker at the time of editing the source code.

A computer-readable recording medium related to the invention according to claim 4 for achieving the above object is a computer-readable recording medium having a program recorded on it for making a computer implement a function of the software development support system according to claim 1, 2 or 3.

A program related to the invention according to claim 5 for achieving the above object is a program for making a computer implement a function of the software development support system according to claim 1, 2 or 3.

In the invention according to claim 1, a source code generating section generates source code in which one or plural insertion markers are respectively inserted into specified places on the basis of design information, and an inserted code extracting section extracts code contained in a range specified by each of the insertion markers in source code as inserted code and then stores each extracted inserted code into an inserted code storing section, associating the relevant inserted code with the identification information for the relevant inserted code. And when the source code generating section generates source code, a code combining section performs a process of combining inserted code with a range specified by an insertion marker in the relevant source code, wherein the relevant inserted code is included in plural pieces of inserted code stored in the inserted code storing section, source code identified by the identification information for the relevant inserted code coincides with the relevant source code, and an insertion marker identified by the relevant identification information exists in the relevant source code and coincides with the relevant insertion marker. Due to this, it is possible to reflect the content added by a developer in source code generated again, without modifying design information. Accordingly, since the developer does not need to input the same code each time source code is generated, it is possible to improve the efficiency of development.

In the invention according to claim 2, when the source code generating section generates source code, the code combining section detects that there is inserted code not combined with the relevant source code, if the relevant inserted code, for which source code identified by the identification information coincides with the relevant source code but an insertion marker identified by the identification information does not exist in the relevant source code, is included in plural pieces of inserted code stored in the inserted code storing section. Due to this, since a developer can recognize the existence of the relevant inserted code and reexamine whether or not the relevant inserted code is really necessary thanks to notifying the developer of such a result of detection, the efficiency of development is more improved.

In the invention according to claim 3, by comprising a code editing section that edits source code and restricts inputting of code in a range other than a range specified by an insertion marker when editing the source code, it is possible to clarify a range in which a developer is to perform addition or modification of code in source code.

BRIEF DESCRIPTION OF THE DRAWINGS

FIG. 2(a) shows an example of design information inputted in a table form, and FIG. 2(b) shows an example where data is added to the design information of FIG. 2(a).

FIG. 3(a) shows an example of design information inputted in a text form, and FIG. 3(b) shows an example where data is added to the design information of FIG. 3(a).

FIG. 4 shows an example of source code generated by a source code generator.

FIG. 5 shows an example of source code generated by a source code generator.

FIG. 6 shows an example of source code generated by a source code generator.

FIG. 7 shows an example of source code generated by a source code generator.

FIG. 8 shows an example of source code generated by a source code generator.

FIG. 9 shows an example of source code generated by a source code generator.

FIG. 11 is a diagram for explaining an example in case of adding the content of source code.

DETAILED DESCRIPTION OF THE PREFERRED EMBODIMENTS

Figure 1:
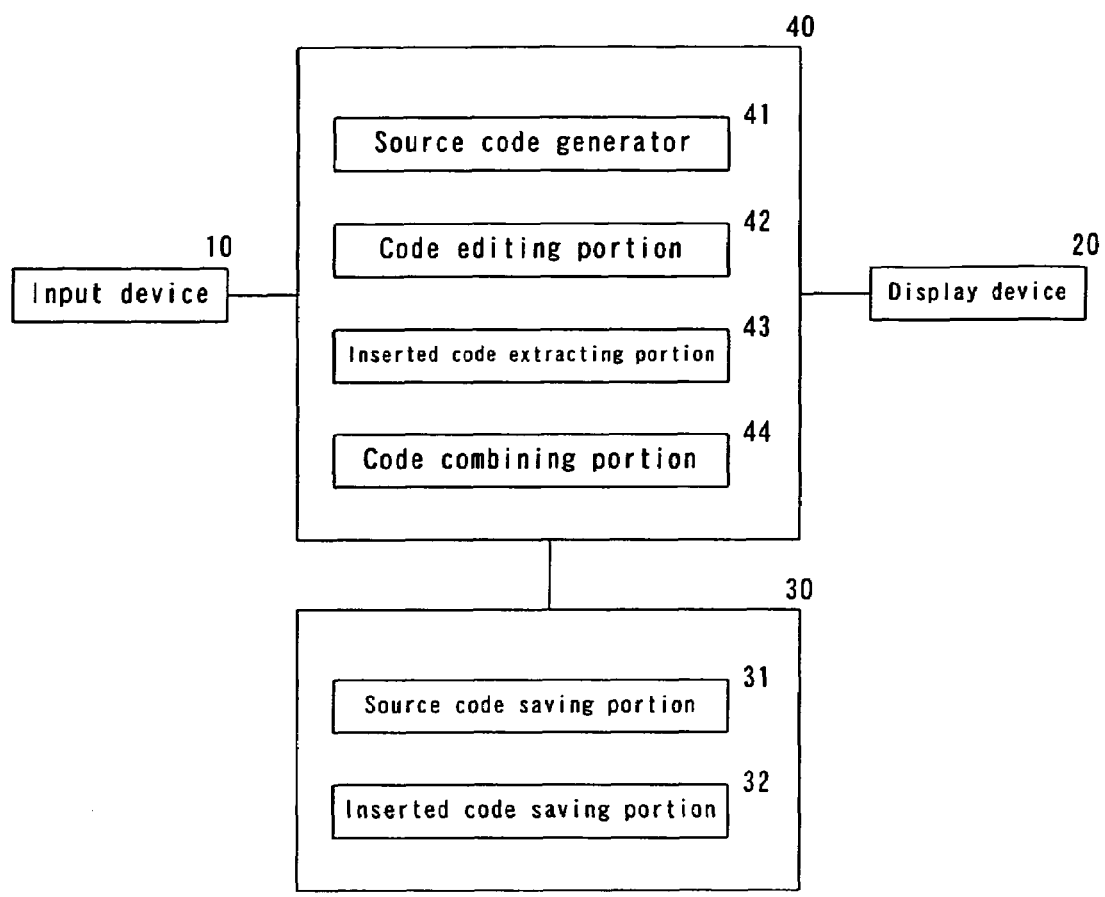
FIG. 1 is a schematic block diagram of a software development support system being an embodiment of the present invention.

The best mode for carrying out the present invention related this application is described with reference to the drawings in the following. FIG. 1 is a schematic block diagram of a software development support system being an embodiment of the present invention.

A software development support system of this embodiment is used for a developer (programmer) to perform software development as adding or modifying the content of source code (program). Concretely, a developer completes software by repeating an operation of generating automatically source code on the basis of design information and adding or modifying code for the source code, using a software development supporting system of this embodiment.

Such a software development support system comprises an input device 10, a display device 20, a storage portion 30 and a control portion 40, as shown in FIG. 1.

The input device 10 is a device for inputting design information or source code for example. A keyboard, a mouse or the like is used as an input device 10. The display device 20 displays an input screen of design information and displays the content of source code.

Such data as design information, source code and the like, and various application programs are stored in the storage portion 30. And the storage portion 30 comprises a source code saving portion 31 and an inserted code saving portion 32. The source code saving portion 31 is working memory for temporarily saving source code generated by the control portion 40. The inserted code saving portion (inserted code storing section) 32 stores inserted code described later.

The control portion 40 comprehensively controls various portions of this system. This control portion 40 has a source code generator (source code generating section) 41, a code editing portion 42, an inserted code extracting portion 43 and a code combining portion 44, as shown in FIG. 1. The source code generator 41 automatically generates source code on the basis of design information.

Design information is described in detail before various portions of the control portion 40 are described. Design information is the information in which the content of source code to be generated is written in a form easy to understand for a person. The design information itself is not a program. A developer inputs design information and modifies the content of it on a design information input screen displayed on the display device 20.

By the way, if a developer is to input all contents in detail at the time of inputting design information, the input operation takes a lot of time and effort. Hence, this embodiment determines to make design information include only contents easy to represent in a typical form. For example, the kind of data, definition of data, aggregative association between data and the like are contents easy to represent in a typical form. On the contrary, the contents of processing and the like are contents hard to represent in a typical form. In general, whether or not some matter is content easy to represent in a typical form depends on the content of software which a developer is going to develop. And contents easy to represent in a typical form can be regularly and easily converted into source code. On the contrary, such contents hard to represent in a typical form as the contents of processing and the like cannot provide a desired program in most cases by automatically source code generation. Therefore, in a software development support system of this embodiment, a developer inputs contents easy to represent in a typical form as design information, and inputs contents hard to represent in a typical form directly into source code. That is to say, a software development support system of this embodiment intends to improve the efficiency of software development by making the source generator 41 and the developer take partial charge of software development.

As an input form of design information, there are various forms. FIG. 2(a) shows an example of design information inputted in a table form, FIG. 2(b) shows an example in case that data have been added to the design information of FIG. 2(a), FIG. 3(a) shows an example of design information inputted in a text form, and FIG. 3(b) shows an example in case that data have been added to the design information of FIG. 3(a).

Hereupon, it is assumed to consider a case of making software for implementing a name list management system, for example. In this case, an input screen of design information in a table form comprises a table 110 for performing definition of data type (data definition) and a table 120 for defining attributes of data (attributes list), as shown in FIG. 2(a). As the table 110 for performing definition of data type, a format template having item names of "data type", "description" and "package" recorded on it is prepared in advance. Since data of "person" is dealt with in a name list management system, for example "Person" is inputted into item "data type", "data representing a person" is inputted into item "description" and "jp.co.ns_sol.sysrdc" is inputted into item "package" by a developer, respectively. And as the table 120 for defining attributes of data, a format template having item names of "symbol", "type" and "access limitation" recorded on it is prepared in advance. "name", "address", "dateOfBirth", "age" and "phoneNo" are inputted into item "symbol" by a developer. Due to this, these five variables result in being included in data of "person". And these variables are represented by inputted symbols in source code generated by the source code generator 41. And the type of each variable is inputted into the item "type". Hereupon, "String", namely, a character string type is specified for each of symbols "name", "address" and "phoneNo", "Date" is specified for symbol "dateOfBirth", and "Integer", namely, an integer type is specified for symbol "age". And in item "access limitation", "readonly" is specified only for symbol "age". When this specification is performed, a developer cannot modify the content of symbol "age" in source code. The reason is that the content of "age" can be calculated from "dateOfBirth". This logic of calculation comes to be written in source code by a developer.

And the design information inputted in a text form in case of making software for implementing the same name list management system as described above is FIG. 3(a). The content of FIG. 3(a) is entirely the same as that of FIG. 2(a) except difference in input forms. Representing design information in a text form may be more convenient depending on a developer, a developing environment and the like.

By the way, the content of design information may be modified during software development. For example, a customer may require addition of a mail address to data of "person". In such a case, for example, a developer adds a variable "mailAddress" of a character string type to data of "person", as shown in FIG. 2(b) or FIG. 3(b). Ordinarily, since variables appear at many places in source code, it takes a lot of time and effort for a developer to perform addition of variables directly in source code. On the other hand, it can easily provide source code having variables added to it to perform addition of the variables in design information and generate again the source code on the basis of the design information on which the addition has been performed.

Next, the source code generator 41 is described. The source code generator 41 automatically generates source code on the basis of design information. Each of FIGS. 4 to 9 shows an example of source code generated by the source code generator 41. Concretely, source code generated by the source code generator 41 on the basis of design information shown in FIG. 2(a) or 3(a) is a series of source code shown in FIGS. 4, 5 and 6. Source code generated by the source code generator 41 on the basis of design information shown in FIG. 2(b) or 3(b) is a series of source code shown in FIGS. 7, 8 and 9. That is to say, hereupon, for convenience of making the drawings source code generated by the source code generator 41 is divided into three parts and the divided three parts of source code are shown in FIGS. 4, 5 and 6 (or FIGS. 7, 8 and 9)

respectively. Therefore, source code obtained by joining together the divided three parts of source code in order of numbers of the figures is the whole source code.

Source code generated by the source code generator 41 is given a specified file name. For example, a series of source code shown in FIGS. 4, 5 and 6 is given a file name of "Person.java" as shown in the second line from the top of FIG. 4. That is to say, the source code generator 41 generates the file name of source code, utilizing information of "Person" inputted into item "data type" of the design information shown in FIG. 2 or 3. Due to this, by knowing the file name of source code, it is possible to easily know what design information the source code has been generated on the basis of.

And not only one piece of source code but also plural pieces of source code may be generated from a piece of design information. For example, three pieces of source code such as source code for displaying a screen, source code for computation and source code for a database may be generated. Such three pieces of source code are not completely independent of one another but these pieces of source code operate in cooperation with one another and thereby a system functions as a whole so as to perform a specified computation using data inputted on a screen and store the result of computation into a database. In case that plural pieces of source code are generated in such a way, each source code is given a file name obtained by combining a common name with a symbol, a character string or the like for identifying it, for example. As a concrete example, in case that plural pieces of source code are generated on the basis of the design information shown in FIG. 2 or 3, these pieces of source code are given file names such as "Person_gui.java", "Person_calc.java", "Person_db.java" and so on, respectively.

Although in the above-mentioned example a case of identifying source code by generating a file name for each source code generated utilizing information of "Person" has been described, differently from such a method, as a method for identifying generated source code a method of changing its storage location can be used. That is to say, source code can be identified by means of a name (called a path name or the like) obtained by combining the name of storage location of the source code and its file name with each other. Hence, for example, in case that the above three pieces of source code are generated, it is enough to give a file name "Person.java" to each of these pieces of source code and store these pieces of source code into separate directories (folders) like "gui/Person.java", "calc/Person.java" and "db/Person.java" respectively.

And this embodiment adds a function of inserting one or plural insertion markers into specified places of source code to the source code generator 41. An insertion marker is an indicator for explicitly indicating a place (range) in which addition or modification of code may be performed by a developer. For example, an insertion marker is inserted into a place where a developer has to input a part of program, a place where a comment may be inserted for convenience of making a program, or the like. Generally the source code generator 41 preferably inserts an insertion marker into every place where addition or modification of code may be performed by a developer.

A developer can input code into a range specified by an insertion marker and into a range other than the range, using the input device 10. In particular, code contained in a range specified by each of insertion markers in source code is referred to as "inserted code". Such inserted code is saved in the inserted code saving portion 32. Although described in detail later, when source code is generated again, the content of the inserted code is reflected in this source code. In case of inputting code into a range other than ranges specified by insertion markers, the content of the inputted code is not saved in the inserted code saving portion 32 nor reflected in source code generated after this. And an insertion marker has also a role of specifying a range to be extracted when the inserted code extracting portion 43 extracts inserted code from source code, as described later.

When the source code generator 41 generates source code, ordinarily no code is included in a range specified by each insertion marker included in the source code. A developer results in inputting code into a range specified by an insertion marker according to need. However, the source code generator 41 can also generate and insert default inserted code into a range specified by an insertion marker at the time of generating source code. Since default inserted code is included in a range specified by an insertion marker, it is stored in the inserted code saving portion 32 as keeping its content as it is if a developer does not perform a modification or the like. On the one hand, if a developer performs a modification or the like of default inserted code, the inserted code with the modified content is extracted and is stored in the inserted code saving portion 32.

Default inserted code is generated in a case as described below. For example, as a part of program to be included in some part in source code particular code is used in most cases, but code other than the particular code may need to be used in a rare case. In such a case, an insertion marker is added to a place where the particular code is to be included and the particular code is contained as default inserted code in a range specified by the insertion marker. Due to this, since it is enough that a developer uses ordinarily the particular code as it is and rewrites the particular code into another code only in case of judging that the particular code needs to be modified, software development can be performed efficiently. And in case that a program includes a part easy to write and a part hard to write, it is possible to set only the part easy to write in the program as default inserted code.

A series of source code shown in FIGS. 4, 5 and 6 comprise six insertion markers $M_1$, $M_2$, $M_3$, $M_4$, $M_5$ and $M_6$. That is to say, a pair of character strings described as "// NSStella mixin point (***) BEGIN" and "// NSStella mixin point (*) END" constitute an insertion marker. Hereupon, a label for identifying an insertion marker is described in "*". That is to say, each insertion marker is identified by a label. Any insertion marker has the same content of its character string except its label. And a range specified by an insertion marker is the range enclosed by "// NSStella mixin point (*) BEGIN" and "// NSStella mixin point (*) END". A developer can add a part of program, a comment and the like between "// NSStella mixin point (*) BEGIN" and "// NSStella mixin point (***) END".

Concretely, a label of "imports" is added to a first insertion marker $M_1$, as shown in FIG. 4. The first insertion marker $M_1$ is provided so that a developer can add an Import statement in case that only five Import statements (five lines written above the marker $M_1$) generated by default are insufficient. A label of "comment" is added to a second insertion marker $M_2$. The second insertion marker $M_2$ is provided so that the developer can further insert a comment into the source code. A label of "fields" is added to a third insertion marker $M_3$. The third insertion marker $M_3$ is provided so that a developer can add a field. A label of "age_readonly" is added to a fourth insertion marker $M_4$, as shown in FIG. 5. Since the source code generator 41 does not automatically generate a part of source code for computing variable "age" specified as "readonly" in design information, the fourth insertion marker $M_4$ is provided in order to have the developer input the part of source code. A label of "methods" is added to a fifth insertion marker $M_5$, as shown in FIG. 6. A particular method is contained as default inserted code in this fifth insertion marker $M_5$. When a developer judges that it is more preferable to modify default inserted code, the developer for example deletes the default inserted code and instead inputs a method marked by the developer him/herself in the fifth insertion marker $M_5$. And a label of "file_tail" is added to a sixth insertion marker $M_6$. The sixth insertion marker $M_6$ is provided at the tail of the source code. Providing this insertion marker $M_6$ allows for a fact that the developer may want to add any other matter.

And a series of source code shown in FIGS. 7, 8 and 9 are almost the same as a series of source code shown in FIGS. 4, 5 and 6. In particular, the number of insertion markers and labels are entirely the same between these two series of source code. The difference between the series of source code shown in FIGS. 7, 8 and 9 and the series of source code shown in FIGS. 4, 5 and 6 is only that a private statement for a mail address and a part of source code for a mail address are added to the series of source code shown in FIGS. 7, 8 and 9 due to adding a mail address to data of "person" in the design information.

In the above examples, as a label "***" included in an insertion marker "// NSStella mixin point (*) BEGIN", "// NSStella mixin point (***) END", a meaningful character string such as "imports", "fields" or the like is used so as to be easy to understand for a developer. In order to make a computer automatically perform an operation of adding such a label to each insertion marker, it is enough to store a specified label adding rule in advance in the storage portion 30 and make the source code generator 41 add a label according to the label adding rule. And a serial number may be simply used as a label.

When source code is generated by the source code generator 41 or the code combining portion 44 described later, the source code is temporarily stored in the source code saving portion 31. And when the content of source code is added or modified by a developer, the source code after the addition or the like is temporarily stored in the source code saving portion 31. At this time, if source code previously generated is stored in the source code saving portion 31, the previous source code is deleted. In development of a program, source code is generated and modified many times, but there is always only one piece of source code in the source code saving portion 31 being working memory.

Source code can be given a new file name and stored in the storage portion 30 at any time. Due to this, a developer can read source code generated at some point of time in the past and refer to the content of it.

The code editing portion 42 is a section that edits source code. Concretely an ordinary editor can be used as the code editing portion 42. Utilizing a function of such a code editing portion 42, a developer inputs design information on a design information input screen displayed in the display device 20, and adds or modifies the content of source code displayed in the display device 20.

The inserted code extracting portion 43 is a section that finds an insertion marker in source code and extracts inserted code contained in the found insertion marker. And for each extracted inserted code, the inserted code extracting portion 43 acquires identification information for identifying source code and an insertion marker in which the relevant inserted code is contained. Here, it is assumed that the information composed of the file name of the source code and the label of the insertion marker is used as identification information. Each inserted code extracted by the inserted code extracting portion 43 is associated with the identification information for the relevant inserted code and stored in the inserted code saving portion 32. For example, a method of naming the file of the inserted code for the identification information of the inserted code can be used as such a method of association. For example, in case that the file name of source code is "Person.java" and the label of an insertion marker is "imports", the file name of the relevant inserted code is determined as "Person.java_imports". Accordingly, if the file name of each inserted code stored in the inserted code saving portion 32 is known, it is possible to easily know in what insertion marker of what source code the inserted code has been contained. It is also possible to collectively save all inserted code included in one piece of source code in one file (for example its file name is set as "Person.java.mixin"). The reason is that if each inserted code is associated with identification information, the inserted code can be identified by the identification information included in the file.

It is only code (inserted code) contained in a range of an insertion marker that the inserted code extracting portion 43 extracts, and code inserted in a range other than this is not extracted. Therefore, code inputted by a developer in a range other than a range specified by an insertion marker is not reflected in source code which the source code generator 41 has generated again on the basis of the design information having the same file name. Here, "design information having the same file name" includes not only design information having entirely the same content but also design information having its content added or modified, so long as the design information has the same file name.

And the inserted code extracting portion 43 may judge whether or not source code is the latest on the basis of the time stamp of the source code before performing a process of extracting inserted code. And it performs a process of extracting inserted code only when the source code is determined to be the latest. For example, a developer may read old source code previously generated from the storage portion 30 and display it on a screen of the display device 20. In such a case, since the inserted code extracting portion 43 judges that the source code is not the latest on the basis of the time stamp of the source code, it does not perform a process of extracting inserted code from the source code.

When the source code generator 41 generates source code, the code combining portion 44 performs a process of combining inserted code with a range specified by an insertion marker in the relevant source code and outputs the processed source code to the display device 20, provided that the relevant inserted code is included in plural pieces of inserted code stored in the inserted code saving portion 32, source code identified by the file name (identification information) of the relevant inserted code coincides with the relevant source code, and an insertion marker identified by this file name exists in the relevant source code and coincides with the relevant insertion marker. For example, when addition is performed on some design information and the source code generator 41 generates source code on the basis of the design information after the addition, the content inputted by a developer into source code generated on the basis of the design information before the addition is not reflected in the source code generated after the addition. The code combining portion 44 plays a role of reflecting inserted code, which is included in the contents inputted by a developer into source code previously generated and is inputted in an insertion marker, in source code generated this time. When the source code generator 41 generates source code for the first time on the basis of new design information, inserted code related to this source code naturally has not been stored in the inserted code saving portion 32. In this case, therefore, the code combining portion 44 does not perform a combination process.

By the way, source code generated on the basis of design information to which some addition has been performed may have some insertion markers newly added to it and may be increased in number of insertion markers in comparison with source code generated on the basis of design information before the addition. Even in such a case, the source code generator 41 gives a different label to each of the new insertion markers. Accordingly, the code combining portion 44 does not combine inserted code with a wrong place in source code at the time of performing a combination process of the inserted code.

And source code generated on the basis of design information from which a part of it has been deleted may be decreased in number of insertion markers in comparison with source code generated on the basis of design information before the deletion. In this case, a few pieces of inserted code may have no place where they are to be combined with the source code, but the source code generator 41 simply does not combine the inserted code with the source code and this does not come into question at all. Such inserted code is thought to become unnecessary in the source code generated this time, but may be inserted code needing to be inputted in other places under certain circumstances. In this embodiment, therefore, it is arranged that when the source code generator 41 generates source code, the code combining portion 44 makes the display device 20 display a warning screen for indicating that there is inserted code not combined with the relevant source code, if the relevant inserted code, of which source code identified by the file name coincides with the relevant source code but an insertion marker identified by the file name does not exist in the relevant source code, is included in plural pieces of inserted code stored in the inserted code saving portion 32. Due to this, since a developer can recognize the existence of such inserted code and reexamine whether or not the inserted code is really necessary, the efficiency of development is more improved.

The source code generator 41, the inserted code extracting portion 43 and the code combining portion 44 perform a process in cooperation with one another. These portions are in cooperation with one another by issuing a command or the like to one another at specified timing. Concretely, the source code generator 41 outputs a specific command to the inserted code extracting portion 43 when design information is sent to the source code generator 41. When the inserted code extracting portion 43 receives this command, it extracts inserted code from the current source code and stores it into the inserted code saving portion 32. After this, the inserted code extracting portion 43 outputs a specific command to the source code generator 41. When the source code generator 41 receives the command, it generates source code on the basis of the relevant design information. And when source code is generated by the source code generator 41, the code combining portion 44 performs a combination process of the source code and inserted code.

Figure 10:
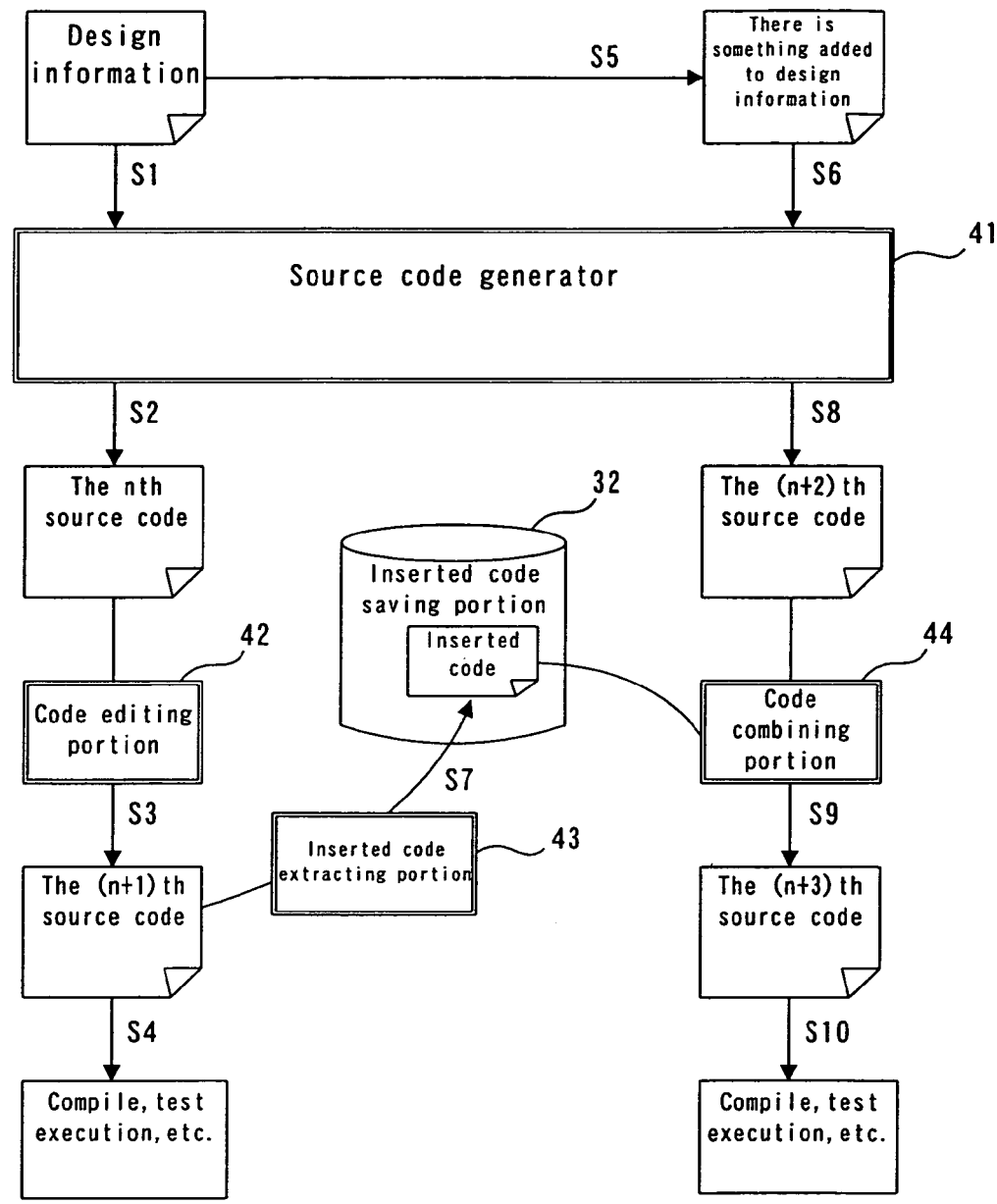
FIG. 10 is a diagram for explaining a processing procedure of a software development support system of this embodiment.

Next, a processing procedure of a software development support system of this embodiment is described. FIG. 10 is a diagram for explaining a processing procedure of a software development support system of this embodiment.

First, a software developer inputs design information on a specific input screen. Concretely the input screen is displayed in an editor screen at the time of activating a specific editor. After the input is completed, when the developer pushes a source code generating button provided on the input screen using the mouse, the inputted design information is sent to the source code generator 41 (S1).

Next, the source code generator 41 generates source code on the basis of the design information (S2). Concretely, when the source code generator 41 receives the design information sent, it outputs a specific command to the inserted code extracting portion 43. When the inserted code extracting portion 43 receives the command, it comes to perform a process of extracting inserted code, but since source code has not been stored in the source code saving portion 31 at this time, the inserted code extracting portion 43 does not perform a process of extracting inserted code but outputs a specific command to the source code generator 41. And when the source code generator 41 receives this command, it generates source code on the basis of the relevant design information and temporarily stores it into the source code saving portion 31. Hereupon, the source code includes one or plural insertion markers. When source code is generated in such a way, the code combining portion 44 comes to perform a combination process of the source code and inserted code, but since inserted code has not been stored in the inserted code saving portion 32 at this time, the code combining portion 44 does not perform the combination process of the source code and inserted code but outputs the source code as it is to the display device 20. In FIG. 10, source code generated in this way is referred to as "the nth source code".

Since this embodiment makes design information include only contents easy to represent in a typical form, the nth source code generated on the basis of the design information is not necessarily complete. Due to this, the developer adds a part of program, a comment and the like to the nth source code or modifies the content of it, utilizing a function of an editor (code editing portion 42) (S3). At this time the content to be added or modified is ordinarily inputted into a place specified by an insertion marker. Thus, source code on which addition or modification has been performed by the developer can be obtained. In FIG. 10, source code obtained in this way is referred to as "the (n+1)th source code". At this time, the (n+1)th source code overwritten on the nth source code is temporarily stored in the source code saving portion 31.

After this, the developer compiles and tests the (n+1)th source code (S4). As a result, in case that the program does not well operate, the developer pursues the causes. For example, when the developer judges that the cause is that the number of pieces of data is too small, he/she determines adding data to the design information. And even in case that the program operates well, the need of adding data may occur according to customer's request. In such a case, the developer reads out design information into an editor screen and adds data to the design information (S5). After the operation of adding or modifying relative to the design information has been finished, when the developer pushes a source code generating button on the input screen using the mouse, the inputted design information is sent to the source code generator 41 (S6).

When the source code generator 41 has the design information sent to it, it sends a specific command to the inserted code extracting portion 43. When the inserted code extracting portion 43 receives such a command, it retrieves an insertion marker from the (n+1)th source code stored in the source code saving portion 31 and finds an inserted code contained in a range specified by each insertion marker. And after it extracts inserted code found in this way, it gives a specific file name to the extracted inserted code and stores this inserted code into the inserted code saving portion 32 (S7). After this, the inserted code extracting portion 43 sends a command for notifying that an inserted code extracting process has been finished to the source code generator 41.

When the source code generator 41 receives the command from the inserted code extracting portion 43, it generates source code on the basis of the design information sent in step S6 (S8). In FIG. 10, this source code is referred to as "the (n+2)th source code". And at this time, the (n+2)th source code overwritten on the (n+1)th source code is temporarily stored in the source code saving portion 31.

Next, when the source code generator 41 generates the (n+2)th source code, the code combining portion 44 performs a combination process of the (n+2)th source code and inserted code (S9). Concretely, the code combining portion 44 finds inserted code, of which source code identified by the file name coincides with the (n+2)th source code and an insertion marker identified by the file name exists in the (n+2)th source code, out of plural pieces of inserted code stored in the inserted code saving portion 32. And the code combining portion 44 combines the found inserted code with a range specified by the relevant insertion marker in the (n+2)th source code. The source code on which a combination process has been performed in this way is temporarily stored in the source code saving portion 31 and is outputted to the display device 20. In FIG. 10, the source code obtained in this way is referred to as "the (n+3)th source code". Hereupon, the difference between the (n+2)th source code and the (n+3)th source code is as follows. That is to say, the (n+2)th source code and the (n+3)th source code both have contents allowing for the addition to design information in step S5. However, the (n+2)th source code does not include the content of inserted code inputted by the developer into the (n+1)th source code, while the (n+3)th source code includes the content of the inputted inserted code. In such a way, the software development support system of this embodiment can reflect inserted code, which is included in the contents inputted by a developer into source code previously generated and is inputted in an insertion marker, in source code generated this time.

After this, the developer compiles and tests that source code (S10). As a result, in case that the program does not well operate and so on, the developer adds or modifies the content of the design information or the content of the source code, utilizing a function of the editor. And the developer results in completing desired source code by repeating the processes of steps S3 to S10.

As described above, the developer is completing software as generating source code and testing the source code, using a software development support system of this embodiment. Particularly, in the software development support system of this embodiment, it is possible to perform the use of performing a test using source code having wrong contents on purpose. That is to say, in the software development support system of this embodiment, even if a developer adds or modifies code in source code, the content having the addition or modification is not reflected in design information. Due to this, at the time of performing a test, it is possible to perform a test which adds test code or code having a bug to source code on purpose and produces a wrong answer on purpose by using such source code. Such test code or code having a bug is naturally in no relation with design. In the prior art, since the content having addition or modification in source code comes to be automatically reflected in design information, such a test has not been able to be performed. On the other hand, in this embodiment it is possible to easily cope with such a test. Test code or code having a bug may be inputted in any place of source code. In case of inputting test code or the like into a range other than a range specified by an insertion marker, source code into which the test code or the like is not inserted is obtained by generating source code again on the basis of the design information having the same file name. On the other hand, in case of inputting test code or the like into a range specified by an insertion marker, source code into which the test code or the like is inserted is obtained by generating source code again on the basis of the design information having the same file name. In this case, for example, by modifying the content of the test code or the like, it is possible to perform a test having a partially modified condition and the like.

And a developer can input an insertion marker itself into an appropriate place in source code. At this time, it is necessary to use the label of the insertion marker different from the labels of other insertion markers. Also in case that a developer has inputted an insertion marker for him/herself, the inserted code extracting portion 43 recognizes the insertion marker and extracts inserted code inputted into the insertion maker. After this, when source code is generated on the basis of the design information having the same file name, since there is not the relevant insertion marker in this source code, the extracted inserted code is naturally not combined with the source code. However, the code combining portion 44 makes the display device 20 display a warning screen indicating that there is inserted code not combined. Due to this, for example, if a developer inputs an insertion marker and inputs test code or the like into the insertion marker for him/herself in advance, when, after this, source code is generated on the basis of the design information having the same file name and a warning screen is displayed, it is possible to insert this inserted code into the specified place and perform the same test again. Hereupon, when a developer pushes a button for inserting the inserted code on the warning screen using the mouse, the code combining portion 44 preferably lets the display device 20 display a screen for specifying an insertion position. Due to this, when the developer specifies the insertion position on the specifying screen, the inserted code is automatically inserted into the desired position by the code combining portion 44.

In a software development support system of this embodiment, a source code generator generates source code in which one or plural insertion markers are respectively inserted into specified places on the basis of design information, and an inserted code extracting portion extracts code contained in each insertion marker in source code as inserted code, gives a specified file name to each extracted inserted code and stores each inserted code in an inserted code saving portion. And when the source code generator generates source code, a code combining portion performs a process of combining inserted code with a range specified by an insertion marker in the relevant source code and outputs the source code on which this process has been performed to a display device, wherein the relevant inserted code is included in plural pieces of inserted code stored in the inserted code saving portion, source code identified by the file name of the relevant inserted code coincides with the relevant source code and an insertion marker identified by this file name exists in the relevant source code and coincides with the relevant insertion marker. Due to this, it is possible to reflect the content added by a developer to source code in source code generated again, without modifying design information. Therefore, since the developer does not need to input the same code each time source code is generated, the efficiency of development can be improved.

The present invention is not limited to the above-mentioned embodiment, but can be changed or modified within the scope of its essential points.

For example, in the above-mentioned embodiment, although the case of indicating an insertion marker with a specific character string has been described, the character string of an insertion marker may be represented in a specific color. This can be implemented by adding a function of retrieving the character string of an insertion marker and displaying the retrieved character string in a specific color at the time of displaying source code on a screen of a display device to a code editing portion. A developer can easily identify an insertion marker by displaying the insertion marker colored in such a way.

And in the above-mentioned embodiment, although the case that a developer may input code into any place in source code has been described, it is also possible to make it impossible to input code into a range other than a range specified by an insertion marker in source code. This can be implemented by adding a function of retrieving the character string of inserted code in source code, permitting to input code only in a range specified by an insertion marker obtained by the retrieval and restricting inputting of code in a range other than a range specified by the insertion marker to the code editing portion. Due to this, since it is possible to clarify the range for a developer to add or modify code in source code, the efficiency of development can be more improved.

Furthermore, in the above-mentioned embodiment, although the case that a developer performs a series of processes with reference to screens displayed in a display device has been described, the present invention is not limited to this but for example, after a code combining portion has performed a combination process of inserted code, a compiling process and the like on the source code obtained by the combination process as it is may be performed without displaying this source code on the display device. It is when a developer inputs design information and when a developer performs addition, modification or the like on source code outputted by a source code generator utilizing a function of a code editing portion (when generating the (n+1)th source code from the nth source code in FIG. 10) that at least the display onto a display device is required, and in other processes, it is enough to display data or information on a display device at optional timing according to purpose.

It is a matter of course that an object of the present invention can be attained also by supplying a program code (including an execution form) of software for implementing functions of the above-mentioned embodiment system to the embodiment system by means of a recording medium having the whole or a part of the program code recorded on it, and making a computer (or CPU, MPU) of the system read the program code stored in the recording medium and execute all or part of operations. In this case the program code itself read from the recording medium results in implementing the functions of the embodiment, and the recording medium having the program code recorded on it results in constituting the present invention.

As a recording medium for supplying a program code, there can be used an ROM, a floppy (trademark) disk, a hard disk, an optical disk, a magneto-optic disk, a CD-ROM, a CD-R, a DVD-ROM, a magnetic tape, a non-volatile memory card and the like. Furthermore, it may be possible to supply a program code by downloading it through a communication circuit or supply and perform a program code utilizing a technique such as JAVA (trademark) and the like.

And it is a matter of course that not only the case that the functions of the embodiment are implemented by executing a program code read by a computer but also the case that the OS or the like running on a computer performs part or all of actual processes on the basis of instructions of the program code and the functions of the embodiment are implemented by these processes are included in the present invention.

Moreover, it is a matter of course that the case that after a program code read out from a recording medium has been written into a memory provided in a function extension board inserted into a computer or a function extension unit connected to a computer, a CPU or the like provided in the function extension board or the function extension unit performs part or all of actual processes on the basis of instructions of the program code and the functions of the embodiment are implemented by these processes is also included in the present invention.

Additionally, the present invention may be a program product comprising a program for making a computer implement the functions of the above-mentioned embodiment system. Here, a program product includes not only a computer program but also a recording medium or a computer having a program recorded on it.

APPLICABILITY IN INDUSTRY

As described above, in a software development support system of the present invention, a source code generating section generates source code in which one or plural insertion markers are respectively inserted into specified places on the basis of design information, and an inserted code extracting section extracts code contained in a range specified by each of the insertion markers in source code as inserted code and then stores each extracted inserted code into an inserted code storing section, associating the relevant inserted code with the identification information for the relevant inserted code. And when the source code generating section generates source code, a code combining section performs a process of combining inserted code with a range specified by an insertion marker in the relevant source code, wherein the relevant inserted code is included in plural pieces of inserted code stored in the inserted code storing section, source code identified by the identification information for the relevant inserted code coincides with the relevant source code, and an insertion marker identified by the relevant identification information exists in the relevant source code and coincides with the relevant insertion marker. Due to this, it is possible to reflect the content added by a developer to source code in source code generated again, without modifying design information. Accordingly, since the developer does not need to input the same code each time source code is generated, the efficiency of development can be improved. Therefore, the present invention can be applied to various systems for supporting development of software by a developer.

What is claimed is:

1. A software development support system used for a developer to perform software development as adding or modifying the content of source code displayed on a screen of a display section, the system comprising:

a processor comprising a source code generating section that generates source code on the basis of design information, wherein one or plural insertion markers are respectively inserted into specified places in the source code by the source code generating section, and each of the insertion markers specified a range enclosed by a first character string for a beginning of the range and a second character string for an end of the range;

an inserted code extracting section that extracts code contained in a range specified by each of the insertion markers in the source code as inserted code, and, for each extracted inserted code, acquires identification information for identifying the relevant source code and the relevant insertion marker wherein the relevant inserted code is contained in a range of the source code specified by the relevant insertion marker in the source code;

an inserted code storing section that stores each relevant inserted code extracted by the inserted code extracting section, associating the relevant inserted code with the identification information for the relevant inserted code; and a code combining section that, when the source code generating section regenerates the source code, performs a process of combining the inserted code with the range of the source code specified by the relevant insertion marker wherein the relevant inserted code is included in plural pieces of inserted code stored in the inserted code storing section, the source code identified by the identification information for the relevant inserted code coincides with the relevant source code, and the insertion marker identified by the relevant identification information exists in the relevant source code and coincides with the relevant insertion marker.

2. A software development support system according to claim 1, wherein;

when the source code generating section regenerates the source code, the code combining section detects that there is the inserted code not combined with the relevant source code, if the relevant inserted code, for which the source code identified by the identification information coincides with the relevant source code but the insertion marker identified by the identification information does not exist in the relevant source code, is included in plural pieces of inserted code stored in the inserted code storing section.

3. A software development support system according to claim 1, further comprising a code editing section that edits the source code and restricts inputting of code in a range other than the range specified by the insertion marker at the time of editing the source code.

4. A computer-readable recording medium having a program recorded on it for making a computer implement a function of the software development support system according to claim 1.

5. A program stored in a memory for making a computer implement a function of the software development support system according to claim 1.

6. A software development support system according to claim 2, further comprising a code editing section that edits the source code and restricts inputting of code in a range other than the range specified by the insertion marker at the time of editing the source code.

7. A computer-readable recording medium having a program recorded on it for making a computer implement a function of the software development support system according to claim 2.

8. A computer-readable recording medium having a program recorded on it for making a computer implement a function of the software development support system according to claim 3.

9. A program stored in a memory for making a computer implement a function of the software development support system according to claim 2.

10. A program stored in a memory for making a computer implement a function of the software development support system according to claim 3.

* * * * *